No. 698,100. Patented Apr. 22, 1902.
H. H. BRINGER.
SPIKE MACHINE.
(Application filed Oct. 2, 1900. Renewed Sept. 27, 1901.)
(No Model.) 4 Sheets—Sheet 1.
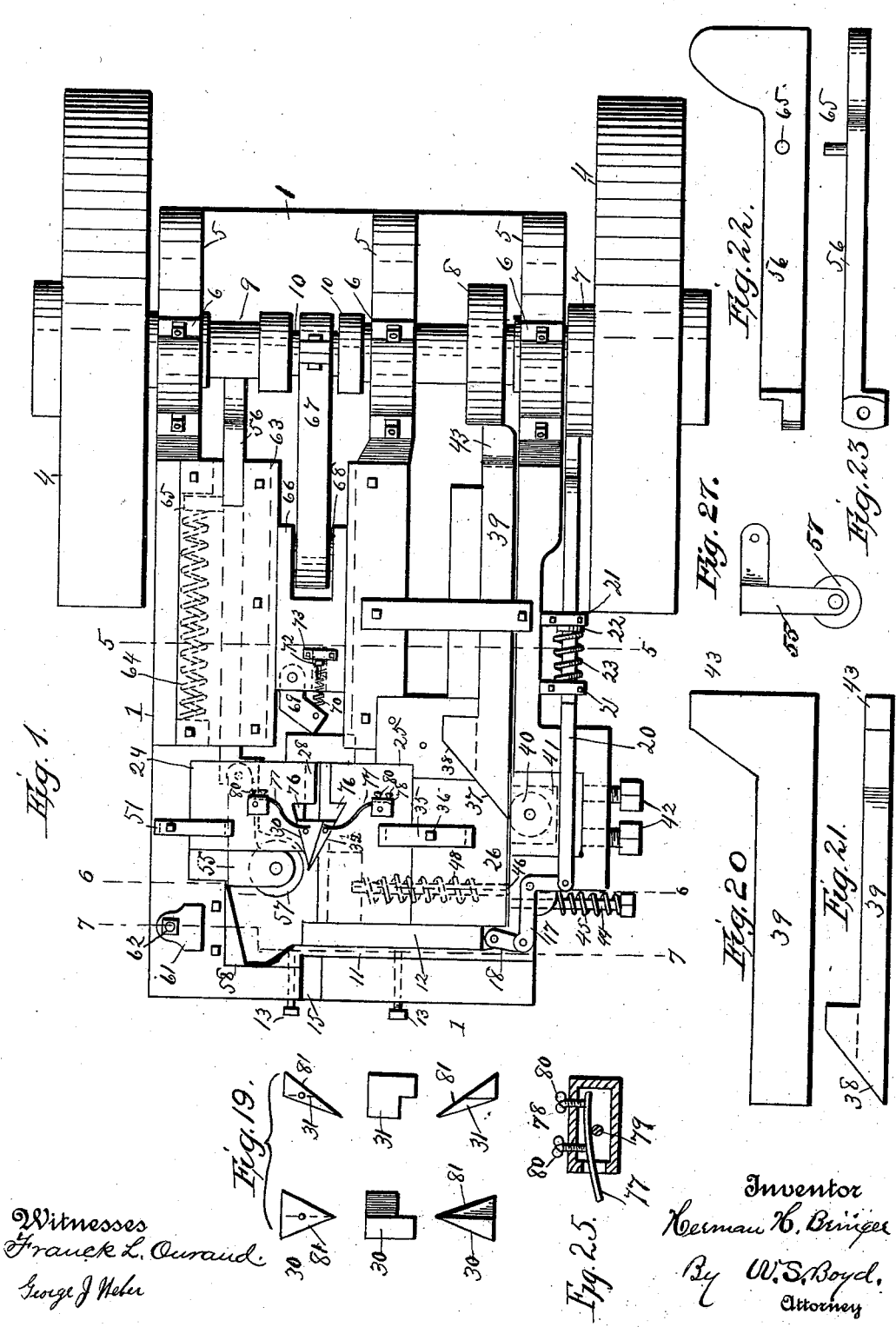
Witnesses
Franck L. Ouraud
George J. Weber
Inventor
Herman H. Bringer
By W. S. Boyd,
Attorney

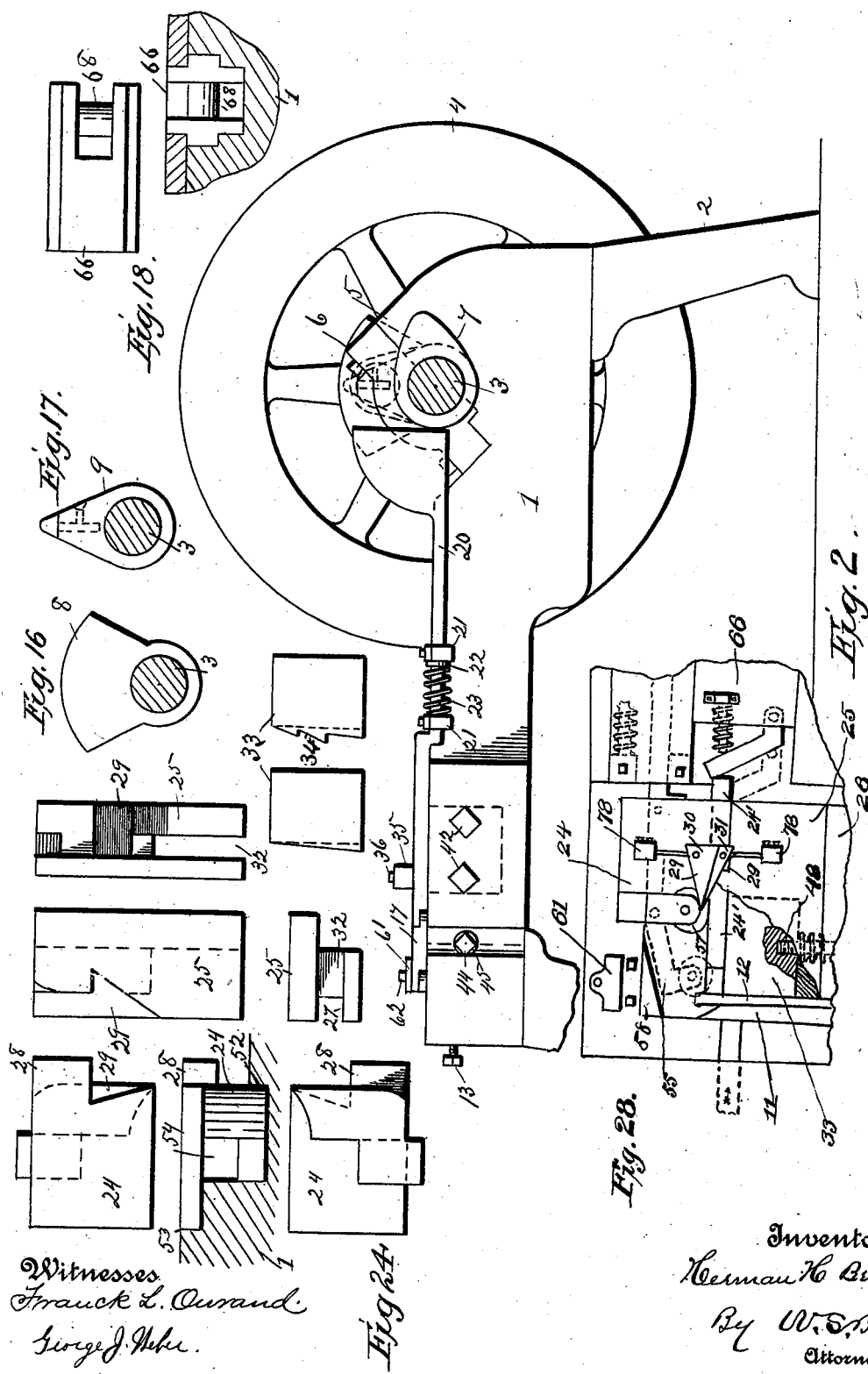

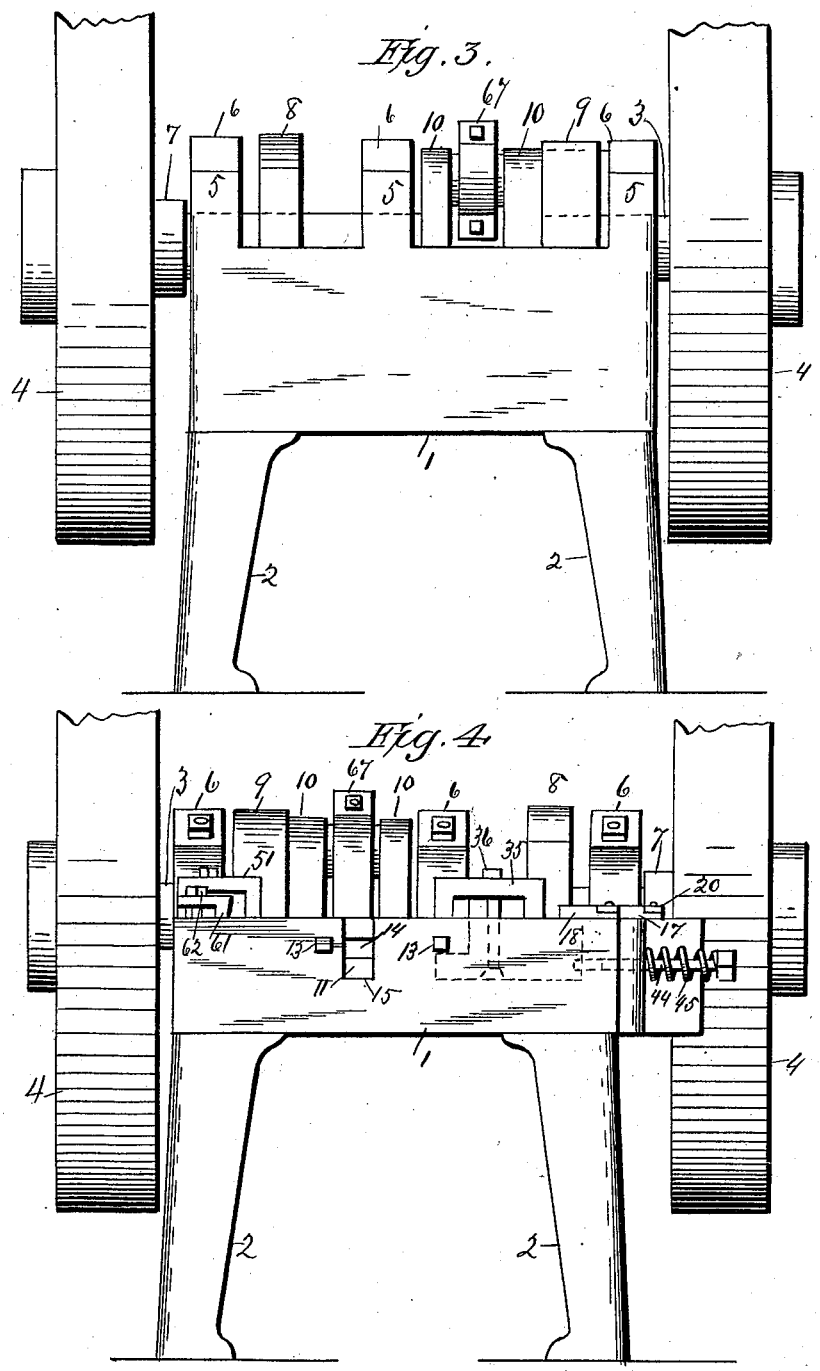

No. 698,100. Patented Apr. 22, 1902.
H. H. BRINGER.
SPIKE MACHINE.
(Application filed Oct. 2, 1900. Renewed Sept. 27, 1901.)
(No Model.) 4 Sheets—Sheet 4.
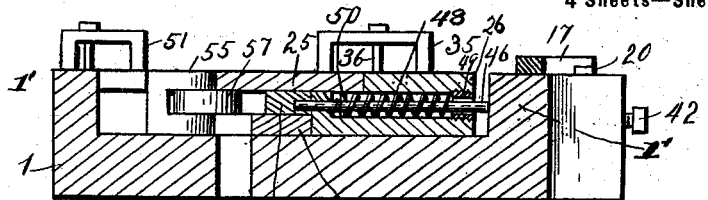
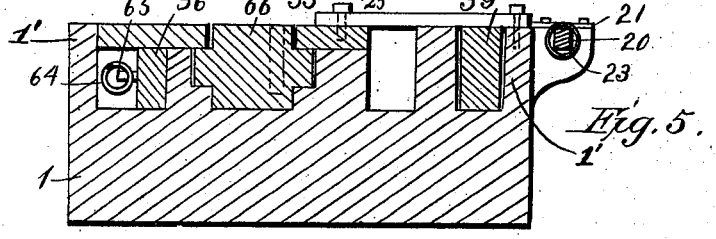
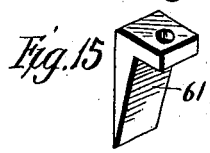
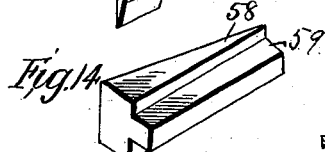
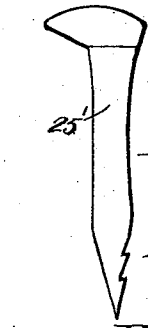
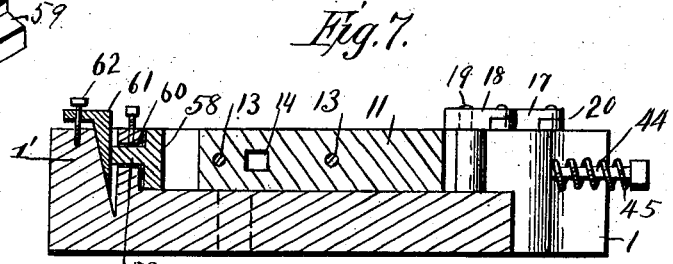
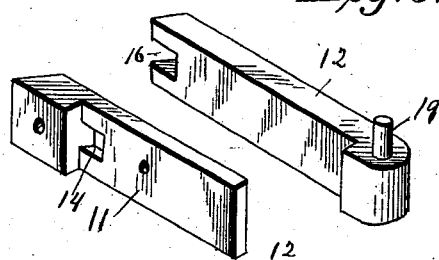
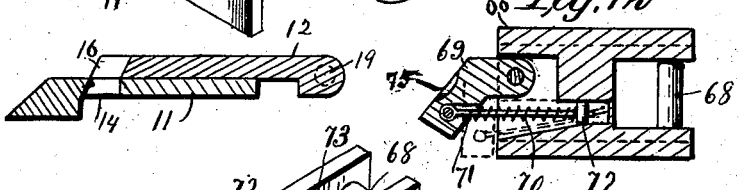
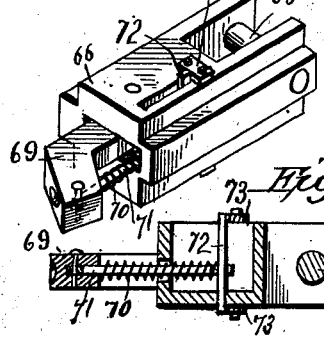
Witnesses
Franck L. Ourand
George J. Uebe
Inventor
Herman H. Bringer
By W. S. Boyd
Attorney
THE NORRIS PETERS CO., PHOTO-LITHO., WASHINGTON, D. C.

United States Patent Office.

HERMAN H. BRINGER, OF PITTSBURG, PENNSYLVANIA, ASSIGNOR OF TWO-THIRDS TO JOHN WEILERSBACHER, OF PITTSBURG, PENNSYLVANIA.

SPIKE-MACHINE.

SPECIFICATION forming part of Letters Patent No. 698,100, dated April 22, 1902.

Application filed October 2, 1900. Renewed September 27, 1901. Serial No. 76,793. (No model.)

*To all whom it may concern:*

Be it known that I, HERMAN H. BRINGER, a citizen of the United States, residing at Pittsburg, in the county of Allegheny and State of Pennsylvania, have invented certain new and useful Improvements in Spike-Machines; and I do declare the following to be a full, clear, and exact description of the invention, such as will enable others skilled in the art to which it appertains to make and use the same, reference being had to the accompanying drawings, and to the numerals of reference marked thereon, which form a part of this specification.

My invention relates to spike-machines, and more particularly to that class of machines for manufacturing railroad-spikes; and it has for its object to produce a machine of this kind which will be durable, strong, and efficient and in which all of the parts can be so adjusted that the material from which the spike is formed can be cut at the proper length, pointed, and headed with one revolution or operation of the machine.

In manufacturing spikes it is both desirable and necessary that the material in the finished spike shall be so distributed as to render the spike strongest at those points which are subject to the greatest strain, and yet requiring the least quantity of material for the purposes desired. A spike possessing these qualities to the greatest degree should have its point beveled or inclined to a distance of at least two and one-eighth inches and the neck reinforced or strengthened upon both sides of the head and having the front face of the body straight and the rear face slightly curved. The rear face of the point may also be provided with notches or serrations which will engage with the timber into which the spike is driven and materially assist in preventing the withdrawal of the spike. A spike constructed in this manner possesses a strength equal to if not greater than the spike commonly known as the "Pennsylvania standard railroad-spike."

With these objects in view my invention consists in the improved construction and novel arrangement of parts of a spike-machine which is peculiarly adapted for manufacturing the hereinbefore-described spike.

Referring more particularly to the drawings, Figure 1 is a top plan view of a spike-machine embodying my invention. Fig. 2 is a side elevation of the same, one of the fly-wheels being removed. Figs. 3 and 4 are end views. Figs. 5, 6, and 7 are transverse sectional views taken on the lines 5 5, 6 6, and 7 7, respectively, of Fig. 1. Figs. 8, 9, and 10 are detail views of the mechanism for cutting off the blank from which the spike is to be formed. Figs. 11, 12, and 13 are similar views of the mechanism for forming the head of the spike. Figs. 14 and 15 are perspective detail views of the adjusting mechanism for forming the point of the spike. Figs. 16 and 17 are sectional views of the crank-shaft, showing different forms of cams. Fig. 18 shows plan and end views of a portion of the header. Fig. 19 shows top, end, and bottom views, respectively, of the gripping mechanism for holding and moving the blank preparatory to its being formed into a finished spike. Figs. 20, 21, 22, and 23 are detail views of the plungers for operating the dies and point-forming mechanism, respectively. Fig. 24 shows top, end, and bottom views of the dies and die-holders. Fig. 25 is a sectional view showing the means for adjusting the gripping mechanism. Fig. 26 is an elevation of a spike formed by my improved machine. Fig. 27 is a detail view of a portion of the point-forming mechanism. Fig. 28 is a plan view of a portion of the machine, showing a blank in position between the dies.

Referring more particularly to the drawings, 1 indicates the bed-plate of my machine, which may be of any suitable size and is supported at a suitable height upon legs 2. The top of the plate is preferably recessed to form walls 1', between which walls the spike-shaping mechanism is located. Journaled transversely across one end of the bed-plate is a shaft 3, one or both ends of which may be provided with the usual fly-wheel 4 and means for operating the same. To secure greater strength, I prefer to form the end of the bed-plate with upward projections 5, within which is formed a portion of the boxings 6 of the shaft 3. The shaft is preferably provided with three cams 7, 8, and 9 and with a crank 10. Arranged transversely across the opposite end of the bed-plate is the cutting mechanism, which preferably consists of a stationary blade 11 and reciprocatory blade 12. The blade 11 is secured to the bed-plate in any suitable manner, as by screws 13, and is provided with an opening 14, which registers with a notch or recess 15 in the wall of the bed-plate, through which the material is fed to the dies. The reciprocatory blade or knife is arranged to be moved back and forth in close contact with the stationary blade and has its forward end cut at an angle, so as to present a sharpened surface to engage with the bar of material from which the blank is severed, the opposite wall of the opening in the stationary die being also inclined for a similar purpose. The forward end of the blade 12 may be recessed or bifurcated, as shown at 16, so as to pass above and below the bar of material, with the cutting edge arranged at the bottom of the bifurcation.

The blade 12 is moved back and forth by means of an elbow-lever 17, which is pivotally secured to the top of the bed-plate and is connected to the rear end of the blade by means of a link 18 and pin 19. The opposite end of the lever 17 is connected with a rod or plunger 20, which is mounted in bearings 21 upon the side of the bed-plate. The opposite end of the rod is provided with a suitable head and located in position to be contacted by the cam 7. A collar 22 is adjustably mounted upon the rod between the bearings, and a spring 23 engages with said collar at one end and with one of the bearings at the other for the purpose of returning the rod and blade to their normal positions after they have been moved by the cam.

The dies 24 and 25 for holding the blank 24' from which the spike 25' is formed are located between the cutting mechanism and the header in position to receive and hold the blank while it is being operated upon. One of the dies 24 is stationary and the other one is movable relatively thereto and is operated by a die-block 26. The inner face of the movable die is grooved longitudinally, as shown at 27, and a portion of the stationary die overhangs the inner face, as shown at 28, and the upper face of each of the dies is provided with an inclined recess 29, within which are seated grippers 30 and 31. The lower edge of the movable die is grooved longitudinally, as shown at 32, within which is seated the forming-block 33 for forming the rear face of the point of the spike. The forward face or edge of block 33 may be provided with projections 34 to form teeth or serrations 34' upon the rear face of the point of the spike. The movable die is held in engagement with the die-block by means of an inverted-U-shaped clamp 35, which has one leg resting upon the top of the block and the other on the die. A bolt 36 projects up through the die-block and through the clamp and is provided with a nut upon its upper end for holding the parts in position, the head of the bolt being countersunk into the under surface of the die-block.

The rear face of the die-block is cut away upon a bevel or incline at one corner, as shown at 37, with which the pointed nose 38 of a plunger 39 engages for the purpose of forcing the die-block and die toward the stationary die. The rear face of the nose of the plunger preferably engages with a roller 40, which is mounted in a block 41, that is seated in the side wall of the bed-plate. Two screws 42 are passed through the side wall in position to engage with the bearing-block 41 and to force it over to a greater or less extent for the purpose of providing an adjustment for regulating the movement of the movable die toward the stationary die. The opposite end of the plunger is provided with a head 43, which is located in position to be engaged by the cam 8 upon the shaft 3. A pin 44 projects through the side of the bed-plate into the die-block and is provided with a spring 45, which will return the block and die to their normal position and force back the plunger 39 after it has been acted upon by the cam.

A rod 46 extends through an opening 47 in the die-block, with its inner end rigidly secured in the forming-block 33. A spring 48 encircles the rod and fits within the opening, with its outer end bearing against a plug 49 and its inner end in engagement with the rod in any suitable manner, as by means of a pin 50. The pin is of such a length that when the die-block is at its outermost limit and the dies are open the inner face of the forming-block will stand even with the inner face of the die, and thereby cause the die to be always cleared. The spring is so arranged that as the die-block moves outward it will expand and clear the die of the spike, but in case the spike should become wedged in the die and prevent the spring from expanding the opposite end of the rod, which projects a slight distance beyond the rear edge of the die-block when the spring is compressed, will engage with the side wall of the machine, and thereby stop the further outward movement of the rod, and will cause the forming-block to force the spike out of the die.

The stationary die 24 is held in position by means of a clamp 51, which rests upon the side of the machine at one end and on top of the die at the other. The bottom of the die is sunk into a recess 52 of the bed-plate, as shown in Fig. 24, and the top of the die fits in a recess 53 in the side wall of the bed-plate. The rear face of the die is grooved longitudinally, as shown at 54, through which a link 55 is reciprocated by means of cam 9 and a plunger 56. The link 55 is pivotally connected with the plunger in any suitable manner, as by a pin, and is preferably made substantially L-shaped, with its free end arranged directly opposite the inner edge of the forming-block and adapted to engage with the end of the blank and draw or force a portion of the blank outward to form the point of the spike. The end of the link may be provided with a roller 57 for engaging with the blank to form the point of the spike. As the link is forced outward and longitudinally of the blank the opposite edge or heel of the link engages with a removable wedge-shaped plate or forming-block 58. By constructing the parts in this manner as the link is forced toward the point of the spike it will be gradually crowded over toward the forming-block 33, and by the time it reaches the limit of its movement it will have drawn one end of the blank down to the desired thickness to give a suitable point to the spike. In the drawings I have shown the inner face of the plate 58 as being straight, which will give a corresponding shape to the front side of the point of the spike; but the face of the spike may be given any desired shape by providing the plate 58 with a corresponding face, against which the heel of the link engages as it moves outward. The rear face of plate 58 is provided with a tongue 59, which projects through a slot or opening 60 in the bed-plate and is engaged by a wedge-shaped key 61, which is adjusted by means of a screw 62. The rear face of key 61 is inclined and fits against a correspondingly-inclined wall of the bed-plate, so that as it is drawn downward by the screw 62 the plate 58 will be forced over toward the forming-block 33, and thereby assist in the formation of the point of the spike. The plunger 56 is held in its seat in the bed-plate by means of a plate 63 and is returned to its normal position after the spike has been formed by means of a spring 64, which engages with a pin 65, projecting from one side of the plunger. The end of the plunger to which the link is pivotally secured is preferably recessed or slightly cup-shaped, against which the end of the link engages as the plunger forces it outward in forming the point of the spike.

The mechanism for forming the head of the spike consists of a block or head 66, which is reciprocated longitudinally of the bed-plate by means of a pitman 67, which is connected therewith by means of a pin 68. The opposite end of the pitman is connected with the crank 10 of shaft 3 by means of ordinary boxing. The forward end of the header-block 66 is recessed longitudinally and a forming-block 69 pivotally secured therein. The free end of block 69 rests against a spring 70 and is normally held away from the end of the header-block. A rod 71 may be pivotally secured to the free end of the block and extend through the spring 70 and through a bar 72, against which the inner end of the spring is adapted to engage. Two plates 73 are adjustably secured to the top and bottom, respectively, of the header-block in position to engage with the ends of bar 72 to hold it in position to place the desired amount of tension upon the spring when the forming-block 69 is forced back toward the end of the header-block in forming the head of the spike. Said plates are preferably slotted for the reception of screws, by means of which they are clamped upon the header-block. The front face of block 69, which may be of any suitable shape, is provided with a recess 75, of such size and depth as to give the proper shape to the top of the head of the spike. The adjacent faces of the dies 24 and 25 are provided with recesses 76 for giving the proper shape and dimensions to the neck of the spike. The grippers 30 and 31 are normally forced forward in their seats in the dies by means of springs 77. The outer end of each of these springs is seated between a wall or abutment 78 and a pin 79. Two screws 80 project through the wall 78 and engage with the spring upon opposite sides of the pin and rock the same upon the pin, and thereby properly adjust the free end of the spring. The inner faces of the grippers are arranged with their gripping-faces to stand parallel or in line with the inner face of the dies, and their upper faces are inclined upon their outer edges, as shown at 81, so as to engage with the inclined walls of the recesses 29 and be moved longitudinally of the dies as the dies are forced toward each other. The springs 77 will normally force the grippers toward the cutting-blades of the machine, so that as soon as the blank has been cut from the bar of material and the movable die commences to move toward the stationary die the grippers will engage with the blank, and as they are forced longitudinally of the dies by the inclined faces they will carry the blank longitudinally of the dies to a sufficient distance to cause one end to be projected beyond the dies far enough to furnish the material for forming the head and to move the opposite end far enough away from the cutting-blades to permit of its being drawn out by the link 55 to form the point of the spike. While the blank is being thus moved longitudinally by the grippers, it is being moved laterally toward the stationary die by the movement of the movable die and die-block, so that by the time it is firmly gripped by the dies it will have been moved laterally and longitudinally into position to be acted upon by the header and point-forming mechanism, as shown in Fig. 28.

In operation the machine is provided with the particular forms of dies necessary to make the desired spike and the material fed thereto by means of any ordinary feeding mechanism, which forms no part of my invention and has not been shown. The material is fed through the dies until it engages with the free end of the forming-block at the end of the header, said block being directly adjacent to the dies. The reciprocatory blade of the cutting mechanism is then operated, which cuts off the blank of proper length from the end of the bar, and the grippers brought into engagement with the blank as the movable die is moved toward the stationary die. As the blank is carried longitudinally through the die by the backward movement of the grippers the header-block is drawn back by the crank-shaft and carries with it the forming-block out of the way of the blank. By the time the blank has been secured between the dies it will have been carried over to such an extent that upon the return stroke of the header the portion of the material projecting beyond the ends of the dies will be crowded into the recess in the dies to form the neck of the spike and the remaining portion will be bent over to one side by the inclined face of the forming-block to form the overhanging portion of the head of the spike. While the blank is still gripped between the dies, the point-forming link is moved forward, so as to give the proper shape to the point of the spike. When the spike is being operated upon, it is inclosed with the dies, and the free end of the link or roller therein, as the case may be, is moved within the groove upon the rear face of the stationary die, thus producing a spike without fins or projecting edges. As soon as the spike is completed the movable die is withdrawn from the stationary die and the spike is dropped through the slot in the bottom of the machine and another blank fed into the dies. In this manner a blank is cut from a piece of material formed into a perfect or finished spike and dropped from the machine by a single revolution of the crank-shaft.

By adjusting the tension of the spring which controls the movement of the forming-die on the header-block the formation of the head of the spike is under perfect control, and if it should be found that the blank has been moved too far forward through the dies the grippers can be adjusted so as to not engage with the blank until the movable die has been moved toward the stationary die to a greater extent. On the contrary, if the blank should not be carried forward a sufficient distance to give enough material to form the head and neck as desired the grippers can be adjusted so as to engage with the blank at an earlier period in the movement of the moving-die and grip the blank nearer the cutting mechanism. The mechanism for forming the point of the spike can be perfectly regulated or adjusted by means of the key at the side of the bed-plate, and the engagement of the movable die with the blank can be adjusted by means of set-screws which engage with the bearing-block seated in the side of the machine.

By providing the bed-plate with solid side walls and arranging the dies between the walls the strain or pressure upon the parts while the spike is being formed will be taken up laterally by the side wall and the parts will be held rigidly in their proper positions, whereby a machine is produced of compact form and possessing enormous strength for the amount of material used in its construction and causing every spike produced to be perfect.

Having described my invention, what I desire to secure by Letters Patent is—

1. In a spike-machine, a bed-plate having its top provided with recesses formed therein leaving integral side walls and intermediate vertical walls combined with spike-forming mechanism upon said plate between the walls therein and so arranged that the strain upon the dies in forming the spike will fall upon the side walls, and means for simultaneously moving a blank laterally and longitudinally.

2. In a spike-machine, a bed-plate, a stationary and laterally-movable die thereon, reciprocatory point-forming mechanism, a header-block provided with a forming-die arranged to bend the head of the spike laterally, and means for moving the blank simultaneously laterally and longitudinally.

3. In a spike-machine, a bed-plate, a stationary and a movable die thereon, a header, point-forming mechanism, and means for moving a blank simultaneously laterally and longitudinally within the dies after it has been severed from a bar of material.

4. In a spike-machine, a bed-plate, a stationary and movable die thereon, a header, point-forming mechanism, means for moving a blank simultaneously laterally and longitudinally, and means for adjusting each of the said parts independently of the other.

5. In a spike-machine, a bed-plate, means thereon for severing a blank from a bar of material, a movable stop for determining the length of the blank, and means for moving the blank simultaneously laterally and longitudinally within the dies as the stop is moved to the rear.

6. In a spike-machine, a bed-plate provided with side and end walls, the end wall being recessed, a perforated cutting-blade secured to the end wall, a reciprocatory blade arranged to move longitudinally against the stationary blade, a reciprocatory rod at the side of the machine, and a spring mounted on said rod for returning it and the reciprocatory blade to their normal positions.

7. In a spike-machine, a bed-plate provided with side and end walls, the end wall being recessed, cutting mechanism adjacent to said recess, a stationary die bearing against one of the side walls, a die-holder bearing against the other wall, a die in said holder, a block mounted in said wall and provided with a roller and a wedge-shaped plunger adapted to be forced longitudinally between the roller and the die-holder.

8. In a spike-machine, a bed-plate provided with side and end walls, the end wall being recessed, cutting mechanism adjacent to said recess, a stationary die bearing against one of the walls, a die-holder against the other wall, a die in said holder, and a wedge-shaped plunger, a removable point-forming block mounted in said die, the forward edge of which is adapted to be provided with notches, whereby the point of the spike may be provided upon its rear face with serrations.

9. In a spike-machine, a bed-plate provided with side and end walls, stationary die at one side of the plate, a die-block at the other side, a die in the block, the lower edge of which is slotted, a forming-block in said slot, a rod secured to said forming-block and projecting through the die-block, a spring on said rod, and means for forcing the die-block and the die toward the stationary die.

10. In a spike-machine, a bed-plate provided with side and end walls, cutting mechanism adjacent to the end wall, a stationary die bearing against one of the side walls, a block seated in the opposite side wall and provided with a roller, screws through the side wall for engaging with said block, a die-block adjacent to said wall, a die in the block, and a wedge-shaped plunger adapted to be forced between the die-block and the roller.

11. In a spike-machine, a bed-plate provided with side walls, a stationary die-block resting against one of the walls, an adjustable roller-block mounted in the other wall, a die-block adjacent to said roller-block, a bolt through the side wall with its inner end secured in the die-block, a spring upon said bolt for normally forcing the die-block outward, and a wedge-shaped plunger adapted to be forced between the roller-block and the die-block.

12. In a spike-machine, a bed-plate provided with side walls, a stationary and a movable die mounted between said walls, grippers in said dies adapted to be moved longitudinally thereof, and means for moving the movable die toward the stationary die.

13. In a spike-machine, a bed-plate provided with side walls, a stationary and a movable die between said walls, spring-actuated grippers mounted in said dies to be moved longitudinally thereof, and means for simultaneously operating the grippers and moving the movable die toward the stationary die.

14. In a spike-machine, a bed-plate provided with side walls, a stationary and a movable die between said walls, the inner face of each of which is provided with an inclined walled recess, inclined grippers in said recesses, and adapted to be moved longitudinally of the dies, means for limiting the movement of the grippers, and means for forcing the movable die toward the stationary die.

15. In a spike-machine, a bed-plate, dies mounted thereon, grippers in said dies arranged to be moved longitudinally thereof, a spring connected with each gripper, the outer end of which rests upon a fulcrum and an adjusting-screw upon each side of the fulcrum in position to engage with said spring.

16. In a spike-machine, a bed-plate provided with side walls, a stationary and a movable die between said walls, the stationary die being grooved longitudinally upon its outer edge, a link mounted in said groove, provided with point-forming means at one end, a forming-block in position to engage with the heel of said link, and means for moving the link longitudinally, and for operating the movable die.

17. In a spike-machine, a bed-plate provided with side walls, a movable and a stationary die, the outer edge of the movable die being grooved longitudinally, a substantially L-shaped link mounted in said groove, the point of which is adapted to form the point of the spike, a forming-block in position to be engaged by the heel of said link, and means for operating the movable die.

18. In a spike-machine, a bed-plate, dies mounted thereon, and a recessed header-block, movable toward and from the dies, and provided with a laterally-movable head-forming die, said die being angled and pivotally secured at one end within said recess.

19. In a spike-machine, a bed-plate, dies mounted thereon, a header-block, the forward end of which is provided with a spring-supported, laterally-movable, head-forming die.

20. In a spike-machine, a bed-plate, dies mounted thereon, a reciprocatory header-block, an angled head-forming die pivotally secured to said block at one end, the free end of which is recessed, a spring seated longitudinally within the block and in engagement with the die, and means for adjusting the tension of said spring.

21. In a spike-machine, a bed-plate, dies mounted thereon, a recessed die-block, a head-forming die pivotally secured to the block at one end, and having its free end extended laterally in position to be forced against the head of the block, and a spring for normally forcing the free end of said die away from the block.

22. In a spike-machine, a bed-plate, dies thereon, a slotted header-block, a head-forming die and a bar in said slots, a rod secured to the free end of the die and projecting through the bar, a spring upon the rod between the die and the bar, and slotted plates mounted upon the top and bottom of the header-block in position to engage with the bar and adjust the tension of the spring.

23. In a spike-machine, a bed-plate, a stationary and a movable die thereon, a header-block at one end of the dies, and cutting mechanism at the other, and means for simultaneously moving the blank through the dies longitudinally, and moving the movable die laterally, and withdrawing the header-block.

24. In a spike-machine, a bed-plate the top of which is recessed and provided with integrally-formed side walls and spike-forming mechanism upon the plate between the walls and so arranged that the strain upon the dies in forming the spike will fall upon the side walls, in combination with means for adjusting the dies.

25. In a spike-machine, a bed-plate, a stationary and laterally-movable die thereon, point-forming mechanism, a header and grippers adjustably secured in the walls of the dies for moving the blank within the same.

In testimony whereof I affix my signature in presence of two witnesses.

HERMAN H. BRINGER.

Witnesses:
ALBERT E. SHOEMAKER,
VINCENT SIMONTON.